(12) United States Patent
Kim et al.

(10) Patent No.: US 11,052,856 B1
(45) Date of Patent: Jul. 6, 2021

(54) FOLDABLE BRAKE PEDAL APPARATUS FOR AUTONOMOUS DRIVING VEHICLE

(71) Applicants: Hyundai Motor Company, Seoul (KR); Kia Motors Corporation, Seoul (KR); Kyung Chang Industrial Co., Ltd., Daegu (KR)

(72) Inventors: Eun Sik Kim, Gyeonggi-do (KR); Hyeon Uk Kim, Daegu (KR); Sung Il Byun, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 16/996,485

(22) Filed: Aug. 18, 2020

(30) Foreign Application Priority Data

Mar. 13, 2020 (KR) .................. 10-2020-0031081

(51) Int. Cl.
    *B60R 21/09* (2006.01)
    *B60T 7/04* (2006.01)
    *B60T 7/06* (2006.01)

(52) U.S. Cl.
    CPC .............. *B60R 21/09* (2013.01); *B60T 7/042* (2013.01); *B60T 7/06* (2013.01)

(58) Field of Classification Search
    CPC ....................................................... B60R 21/09
    See application file for complete search history.

(56) References Cited

U.S. PATENT DOCUMENTS

| | | | | |
|---|---|---|---|---|
| 5,996,439 A | * | 12/1999 | Elton | B60T 7/065 |
| | | | | 180/255 |
| 6,212,970 B1 | * | 4/2001 | Bortolon | G05G 1/405 |
| | | | | 74/512 |
| 6,321,617 B1 | * | 11/2001 | Schwyn | G05G 1/405 |
| | | | | 74/512 |
| 6,592,494 B2 | * | 7/2003 | St. Pierre | G05G 1/405 |
| | | | | 192/99 S |

FOREIGN PATENT DOCUMENTS

KR    10-2017-0137427 A    12/2017

* cited by examiner

*Primary Examiner* — Vicky A Johnson
(74) *Attorney, Agent, or Firm* — Mintz Levin Cohn Ferris Glovsky and Popeo, P.C.; Peter F. Corless (57) ABSTRACT

A foldable brake pedal apparatus for an autonomous driving vehicle is provided. A brake pedal is exposed to the interior of the vehicle allowing a driver to manipulate the brake pedal in a manual driving mode and the brake pedal is prevented from being exposed to the interior of the vehicle to prevent the driver from manipulating the vehicle in an autonomous driving situation.

12 Claims, 12 Drawing Sheets

FOLDABLE BRAKE PEDAL APPARATUS FOR AUTONOMOUS DRIVING VEHICLE

CROSS REFERENCE TO RELATED APPLICATION

The present application claims priority to Korean Patent Application No 10-2020-0031081, filed Mar. 13, 2020, the entire contents of which is incorporated herein for all purposes by this reference.

BACKGROUND

1. Field of the Disclosure

The present disclosure relates to a foldable brake pedal apparatus for an autonomous driving vehicle, and more particularly, to technology for a foldable brake pedal apparatus for an autonomous driving vehicle, by which a brake pedal is exposed to the interior of the vehicle allowing a driver to manipulate the brake pedal in a manual driving mode and preventing the brake pedal from being exposed to the interior of the vehicle in an autonomous driving situation.

2. Description of the Prior Art

An autonomous driving vehicle is a smart vehicle combined with an autonomous driving technology for allowing the vehicle to directly travel toward a destination while a driver does not directly manipulate a steering wheel, an accelerator pedal, and a brake, and the technology for autonomous driving vehicles has recently been rapidly developed. In a general autonomous driving situation, the driver may select a manual driving mode in which the driver directly operates the vehicle and an autonomous driving mode in which the vehicle directly travels to the destination without user manipulation of the driver.

In the autonomous driving mode, since the driver may stretch into a resting position, the pedals may interfere with the positioning of the driver in such a position when the pedals are exposed to the interior of the vehicle. Further, the autonomous driving mode is a situation in which the driver does not manipulate the pedals (e.g., the accelerator pedal or the brake pedal) of the vehicle, and if the driver manipulates the pedal during the autonomous driving, the vehicle controller is configured to determine that the driver intends to terminate the autonomous driving and intends to directly operate the vehicle and thus terminates the control for autonomous driving.

However, since the pedal of the vehicle is installed to be exposed in the space below the driver's seat, the driver may inadvertently manipulate the pedal in the autonomous driving mode and in this case, an accident may occur based on road conditions or an inter-vehicular distance. Accordingly, it is necessary to develop a technology for a new pedal apparatus, by which a pedal is exposed to the interior of a vehicle allowing a driver to manipulate the vehicle in a manual driving mode and preventing the pedal from being exposed to the interior of the vehicle and preventing the driver from manipulating the vehicle to ensure a comfortable rest for the driver and to ensure prevention of a malfunction in an autonomous driving situation.

The items described as the background technologies are provided merely for improvement of understanding of the background of the present disclosure, and should not be understood as an admission that the items correspond to the conventional technology known to those skilled in the art to which the present disclosure pertains.

SUMMARY

The present disclosure provides a foldable brake pedal apparatus for an autonomous driving vehicle, by which a brake pedal is exposed to the interior of the vehicle allowing a driver to manipulate the brake pedal in a manual driving mode and the brake pedal may be prevented from being exposed to the interior of the vehicle to prevent the driver from manipulating the vehicle in an autonomous driving situation, whereby the driver may rest comfortably in the autonomous driving situation, and moreover, the safety of the vehicle may be improved by interrupting a malfunction of the brake pedal in an autonomous driving situation. The present disclosure also provides a foldable brake pedal apparatus for an autonomous driving vehicle, by which the strength and the rigidity of the pedal member may be sufficiently secured by minimizing the number of apertures formed in the pedal member 10.

In accordance with an aspect of the present disclosure, a foldable brake pedal apparatus for an autonomous driving vehicle may include: a pedal member fixedly installed in a lower space of a driver's seat and coupled such that a hinge bolt passes through left and right side surfaces thereof; a rotary link disposed in the pedal member, through which the hinge bolt passes, and installed to be rotated about the hinge bolt; an actuator fixedly installed in the pedal member while being disposed in the pedal member and coupled to be rotated by the medium of a first rod of the rotary link and an upper pin; and a brake pedal inserted into the pedal member, an upper end of which may be coupled to be rotated by the medium of a second rod of the rotary link and a lower pin, and in which a lower portion of the lower pin may be connected to a brake booster through a pedal push rod.

The foldable brake pedal apparatus may further include a restraining rod, a first end of which may be fixed to the pedal member and a second end of which may be installed to be stopped by the lower pin, and configured to restrict forward movement of the lower pin when the brake pedal is rotated forward about the lower pin as a driver engages the brake pedal to manipulate the brake pedal. The restraining rod may have a ring part, a first end of which is fixed to a rear surface of the pedal member and a second end of which extends toward the front side and is bent in an L shape, and the ring part may be installed to pass through the upper side of the lower pin and contact the front side.

The foldable brake pedal apparatus may further include a return spring installed to connect the pedal member and the brake pedal, and configured to accumulate an elastic force while the length thereof extends when the brake pedal is rotated to the front side as the driver engages the brake pedal and rotate the brake pedal to the rear side with the accumulated elastic force to return the brake pedal when the driver disengages the brake pedal. The foldable brake pedal apparatus may further include a pedal sensor connected to the brake pedal through a mechanical structure while being fixed to the pedal member and configured to detect the rotational angle of the brake pedal and generate a signal related to braking when the brake pedal is rotated.

Further, only a bolt bore, through which the hinge bolt passes, may be formed on the left and right side surfaces of the pedal member, and the bolt bore may have a circulate shape, the cross-section of which is the same as the cross-section of the hinge bolt. The rotary link may include a link pipe, through which the hinge bolt passes, the first rod and the second rod may be coupled to a link pipe while defining an obtuse angle, and two first rods and two second rods may be spaced apart from each other to face each other along the lengthwise direction of the link pipe.

The actuator may include a linear motor fixed to the pedal member by a motor bracket; and a plunger configured to move forward and backwards when the linear motor is operated and an end of which may be connected to the first rod by the upper pin. Each of the first rod and the second rod may have an upper pin aperture and a lower pin aperture, through which the upper pin and the lower pin may pass, respectively, and the upper pin apertures and the lower pin apertures may be elliptical slot apertures or slots that extend along the lengthwise directions of the first rod and the second rod, respectively.

The actuator may be disposed on the front side of the lower pin while the hinge bolt and the upper pin are sequentially disposed on the upper side of the lower pin, the brake pedal may be rotated to the front side about the lower pin when the driver engages the brake pedal, and the brake booster may be operated as the pedal push rod is moved forward when the brake pedal is rotated to the front side, and the lower pin may be maintained in a state in which the lower pin is restricted by the restraining rod to be prevented from being moved forward.

The actuator may be disposed on the front side of the lower pin while the hinge bolt and the upper pin are sequentially disposed on the upper side of the lower pin, the first rod may be pulled to the front side, on which the actuator is disposed, through an operation of the actuator, and the brake pedal may change to a concealed state, in which the brake pedal is not exposed to the interior of the vehicle as a lower end of the brake pedal is rotated to be moved to the front side when the brake pedal is rotated about a connection point of the brake pedal and the pedal push rod through rearward movement of the lower pin when the rotary link is rotated about the hinge bolt and the second rod is rotated toward the rear side.

In the concealed state, the first rod may be pushed to the rear side through an operation of the actuator, and the brake pedal may change to a popped-up state, in which the brake pedal is exposed to the interior of the vehicle, as a lower end of the brake pedal is rotated to be moved to the rear side when the brake pedal is rotated about a connection point of the brake pedal and the pedal push rod through forward movement of the lower pin when the rotary link is rotated about the hinge bolt and the second rod is rotated toward the front side.

According to the foldable brake pedal apparatus for an autonomous driving vehicle according to the present disclosure, the lower end of the brake pedal may be popped up to be exposed to the interior of the vehicle thus allowing the driver to manipulate the brake pedal in a manual driving mode in which the driver directly operates the vehicle, and the lower end of the brake pedal may be rotated to be moved forward through an operation of the actuator to conceal the brake pedal preventing the driver from manipulating the brake pedal in an autonomous driving mode in which the driver does not directly operate the vehicle, whereby the driver may take a rest comfortably in the autonomous driving situation, and moreover, the safety of the vehicle may be improved by interrupting a malfunction of the brake pedal in an autonomous driving situation.

Further, according to the present disclosure, since only the bolt bore, through which the hinge bolt passes, is formed on the side surface of the pedal member, the strength and the rigidity of the pedal member may be secured by minimizing the number of apertures formed on the side surface of the pedal member.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a foldable brake pedal apparatus for an autonomous driving vehicle according to an exemplary embodiment of the present disclosure will be discussed with reference to the accompanying drawings.

The foldable brake pedal apparatus for an autonomous driving vehicle according to the present disclosure, as illustrated in FIGS. 1 to 12, may include: a pedal member 10 fixedly installed in a lower space of a driver's seat and coupled such that a hinge bolt 21 passes through left and right side surfaces 11 thereof a rotary link 30 disposed in the pedal member 10, through which the hinge bolt 21 passes, and installed to be rotated about the hinge bolt 21; an actuator 50 fixedly installed in the pedal member 10 while being disposed in the pedal member 10 and coupled to be rotated by the medium of a first rod 31 of the rotary link 30 and an upper pin 41; and a brake pedal 70 inserted into the pedal member 10, coupled to be rotated by the medium of a second rod 32 of the rotary link 30 and a lower pin 42, and in which a lower portion of the lower pin 42 may be connected to a brake booster 60 through a pedal push rod 61.

Two left and right side surfaces 11 of the pedal member 10 may be disposed in parallel in the pedal member 10, front sides and upper sides of the left and right side surfaces 11 may be connected to each other through a front surface and an upper surface thereof, and the rear side thereof may be connected through a rear surface 11, an opened structure may be formed on the lower side, and the front surface may be fixedly coupled to a dash panel that forms a vehicle body. The rear surface 12 of the pedal member 10 may be integrally formed when the pedal member 10 is manufactured, or a separate bracket may be formed, and the rear surface 12 of the pedal member 10 may be coupled to a pedal member 10 through welding when a separate bracket is formed.

A cowl bracket 80 may be coupled to the upper surface of the pedal member 10, and the cowl bracket 80 may be coupled to a cowl panel. The pedal member 10 according to the present disclosure has a structure in which only a bolt bore 13 is formed on the left and right side surfaces 11 thereof and thus, only a hinge bolt 21 may pass through the bolt bore 13, and accordingly, the strength and the rigidity of the pedal member 10 may be secured as the number of the apertures formed on the side surface of the pedal member 10 may be minimized. It is preferable that the bolt bore 13 formed on the left and right side surfaces 11 of the pedal member 10 has a circular shape that is the same as the cross-section of the hinge bolt 21 to secure the strength and the rigidity of the pedal member 10.

The exemplary embodiment of the present disclosure may further include: a restraining rod 90, a first end of which may be fixed to the pedal member 10 and an opposite or second end of which may be installed to be stopped by the lower pin 42, and configured to restrict forward movement of the lower pin 42 when the brake pedal 70 is rotated forward about the lower pin 42 as a driver engages the brake pedal 70. In particular, the restraining rod 90 may include a hook part 91, a first end of which may be fixed to the rear surface 12 of the pedal member 10 and a second end of which may extend toward the front side and is bent in an L shape, and the hook part 91 may pass through the upper side of the lower pin 42 to contact the front side of the lower pin 42.

Two restraining rods 90 may be provided on the rear surface 12 of the pedal member 10 in parallel to be spaced apart from each other in the left and right direction, two hook parts 91 formed at ends of the restraining rods 90 may be stopped by opposite ends of the lower pin 42, respectively, as the two restraining rods are provided, and accordingly, the brake pedal 70 may be rotated about the lower pin 42 in a more stable state. Further, the exemplary embodiment of the present disclosure may further include a return spring 100 installed to connect the pedal member 10 and the brake pedal 70, and the return spring 100 may accumulate an elastic force while the length thereof is prolonged when the brake pedal 70 is rotated to the front side as the driver engages the brake pedal 70 and rotate the brake pedal 70 to the rear side with the accumulated elastic force to return the brake pedal when the driver disengages the brake pedal 70.

The return spring 100 may be a compression coil spring, but the present disclosure is not limited thereto. Further, the exemplary embodiment of the present disclosure may further include a pedal sensor 110 fixed to one side surface of the pedal member 10 and connected to the brake pedal 70 through a mechanical structure. A connection pin 111 may be coupled to the brake pedal 70 to protrude to one side, the pedal sensor 110 may include a rotary lever 112, and the connection pin 111 and the rotary lever 112 may be coupled to each other to be connected to each other. Accordingly, when the brake pedal 70 is rotated, the connection pin 111 and the rotary lever 112 may also be rotated together.

Further, a permanent magnet may be coupled to the rotary lever 112, a printed circuit board (PCB) may be disposed in the interior of the pedal sensor 110 to face the permanent magnet, and the PCB may be electrically connected to a power device such as a battery through a wire. Accordingly, when the brake pedal 70 is rotated as the driver engages the brake pedal 70, the connection pin 111 and the rotary lever 112 may be rotated together, the location of the permanent magnet coupled to the rotary lever 112 may be changed when the rotary lever 112 is rotated, and the PCB may be configured to detect the rotational angle of the brake pedal 70 through a change in the intensity of the magnetic field according to the change of the rotational location of the permanent magnet to generate a signal related to braking.

The pedal sensor 110 according to the exemplary embodiment of the present disclosure may be a contact type pedal sensor, to which the connection pin 111 and the rotary lever 112 may be connected, but may be a non-contact type pedal sensor including only a permanent magnet and a PCB. A hinge pipe 71 may be coupled to an upper end of the brake pedal 70 to pass through the upper end of the brake pedal 70 leftwards and rightwards, the hinge pipe 71 may be inserted into the pedal member 10, and the lower pin 42 may pass through the hinge pipe 71.

A brake pedal pad 72 that is operated by the driver to may be disposed at a lower end of the brake pedal 70. The rotary link 30 according to the present disclosure may include a link pipe 33, through which the hinge bolt 21 passes, the first rod 31 and the second rod 32 may be coupled to the link pipe 33 while defining an obtuse angle, and two first rods 31 and two second rods 32 may be spaced apart from each other along the lengthwise direction of the link pipe 33 to face each other. The rotary link 30 may be disposed in the pedal member 10, the hinge bolt may be coupled to the nut 22 after passing through the bolt bore 13 formed on the left and right side surfaces 11 of the pedal member 10 and the link pipe 33 of the rotary link 30, and accordingly, the rotary link 30 may be rotated about the hinge bolt 21.

A plunger that forms the actuator 50 may be inserted between the two first rods 31 that protrude from the rotary link 30 to the upper side of the link pipe 33, and may be coupled to be rotatable through the upper pin 41. Further, the hinge pipe 71 of the brake pedal 70 may be inserted between the two second rods 32 that protrude from the rotary link 30 to the lower side of the link pipe 33, the lower pin 42 may pass through the second rod 32 and the hinge pipe 71, and accordingly, the brake pedal 70 may be rotated about the lower pin 42.

The actuator 50 may include a linear motor 51 fixed to the pedal member 10 by the medium of the motor bracket 120, and a plunger 52 which moves forward and backwards when the linear motor 51 is operated and an end of which is connected to the first rod 31 by the upper pin 41. In the first rod 31 and the second rod 32 of the rotary link 30, an upper pin aperture 34 and a lower pin aperture 35, through which the upper pin 41 and the lower pin 42 pass, respectively, may be formed, and the upper pin aperture 34 and the lower pin aperture 35 may be formed as elliptical slots that extend along the lengthwise directions of the first rod 31 and the second rod 32, respectively.

Figure 1:
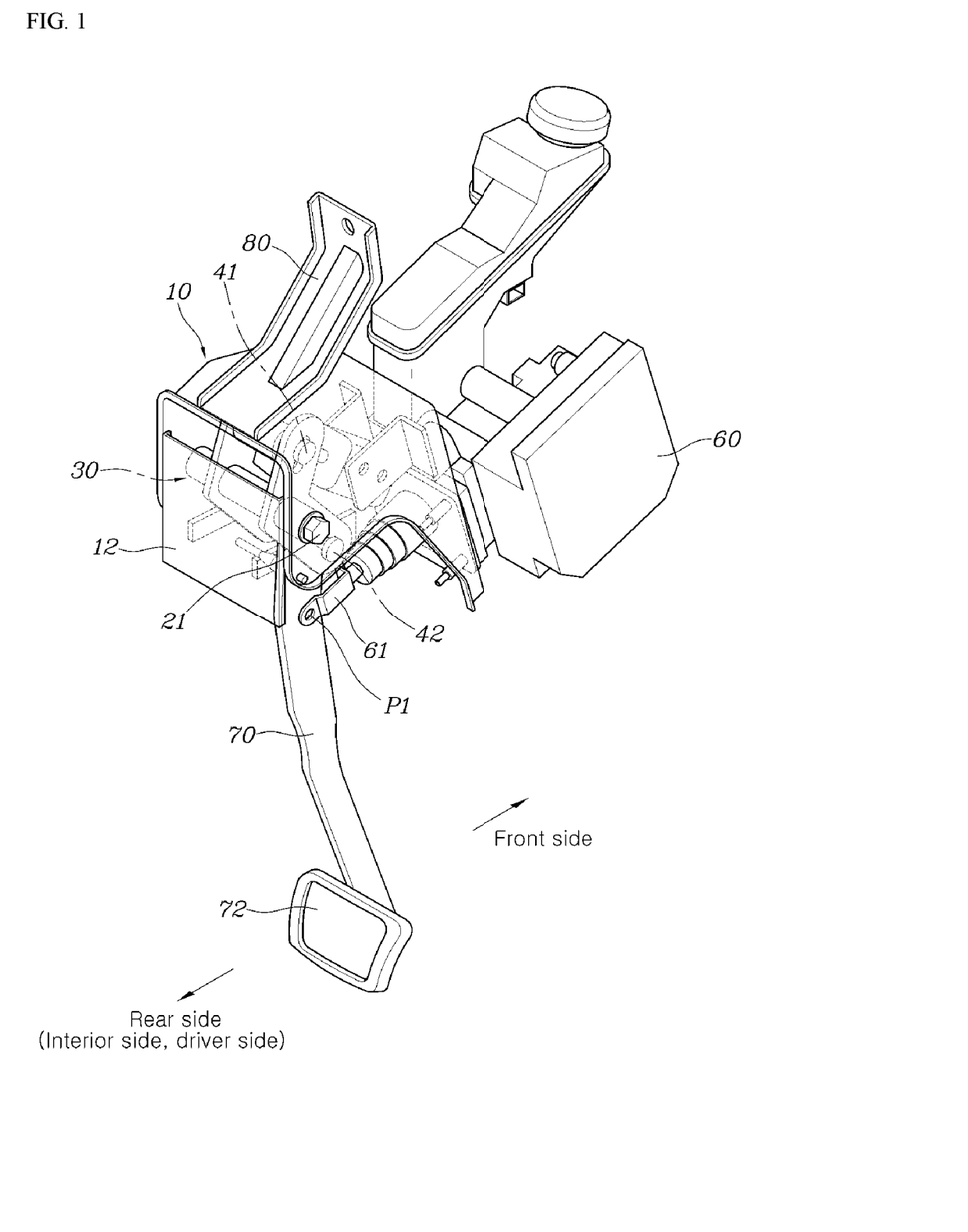
FIGS. 1 to 3 are a perspective view, a front view, and a side view of a foldable brake pedal apparatus for an autonomous driving vehicle according to an exemplary embodiment of the present disclosure.
Figure 2:
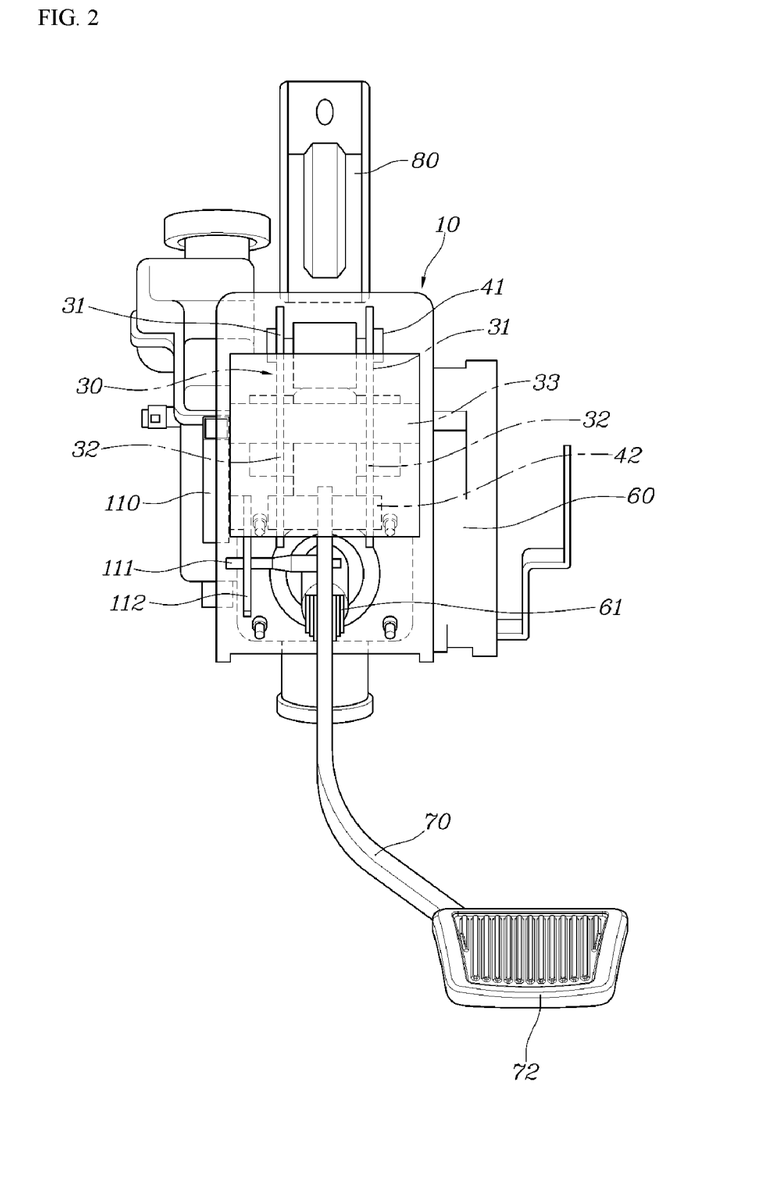
Figure 3:
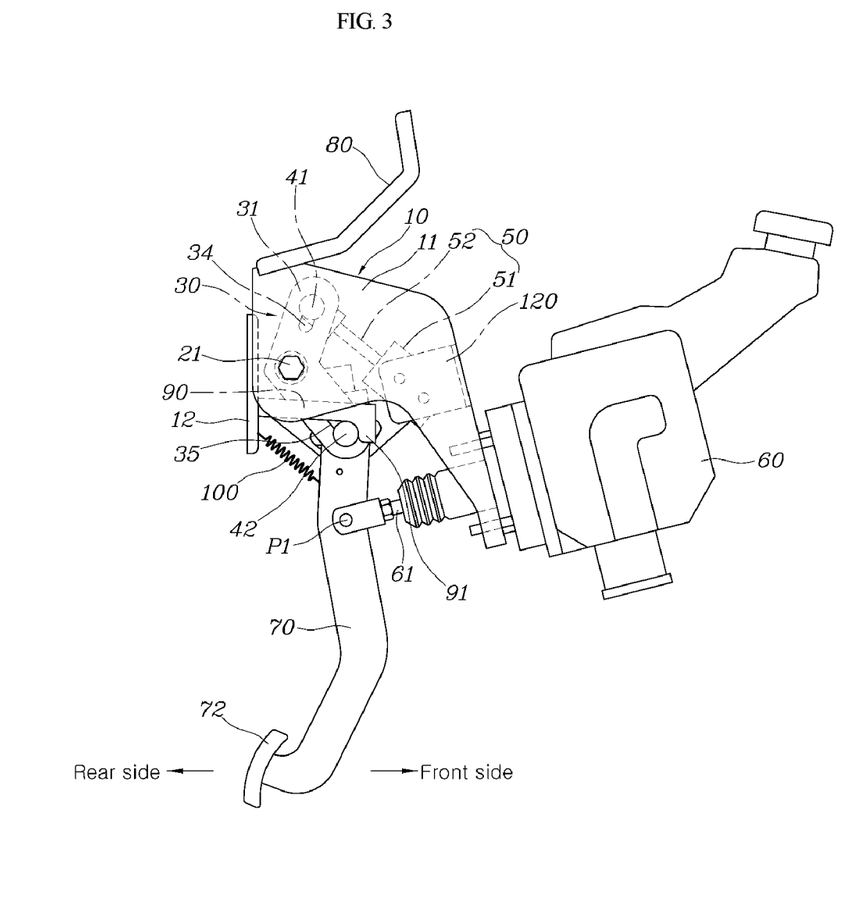
Figure 4:
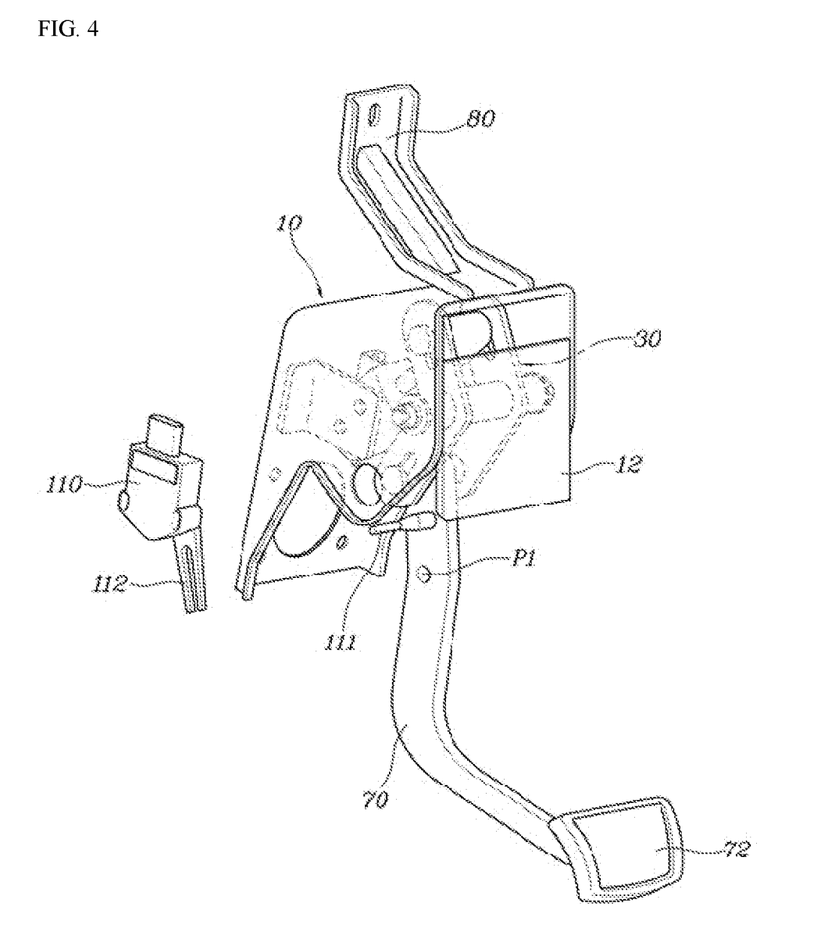
FIG. 4 is a perspective view in which a pedal sensor is separated according to an exemplary embodiment of the present disclosure.
Figure 5:
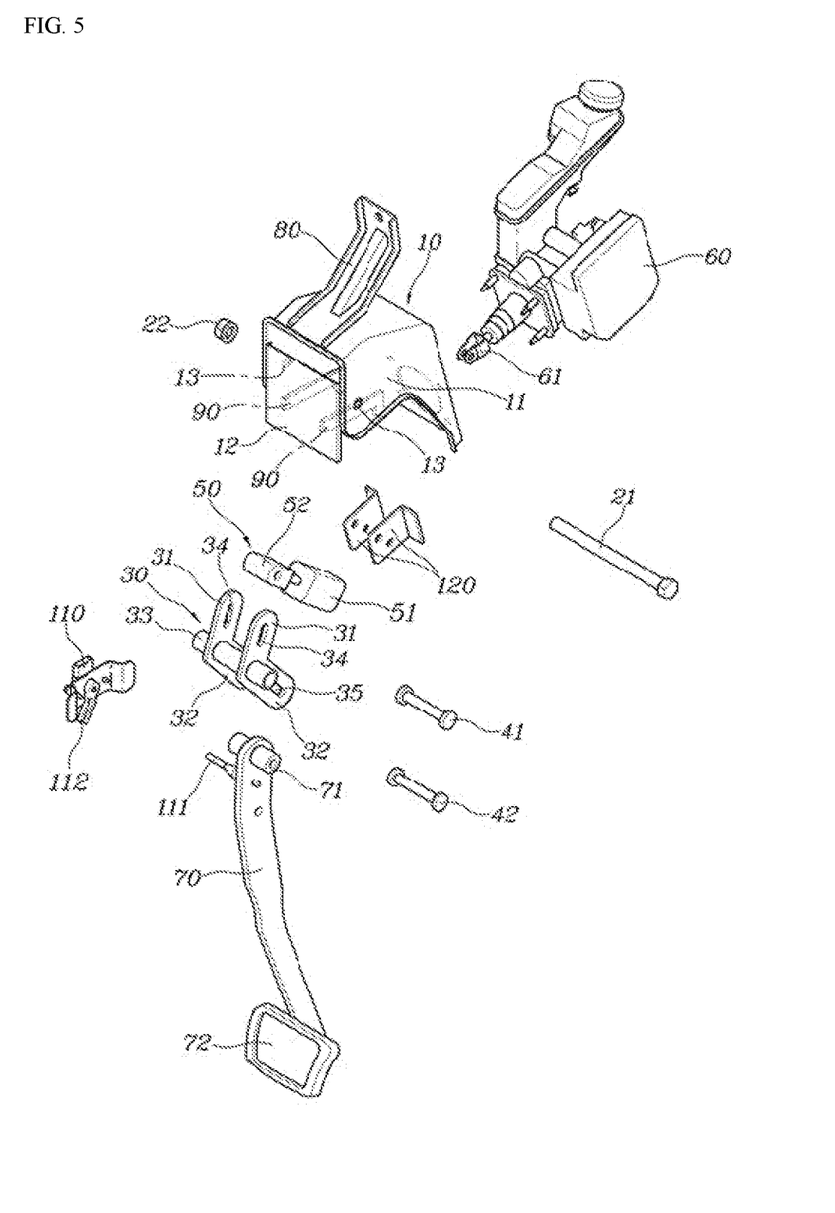
FIG. 5 is an exploded perspective view of the foldable brake pedal apparatus for an autonomous driving vehicle according to an exemplary embodiment of the present disclosure.
Figure 6:
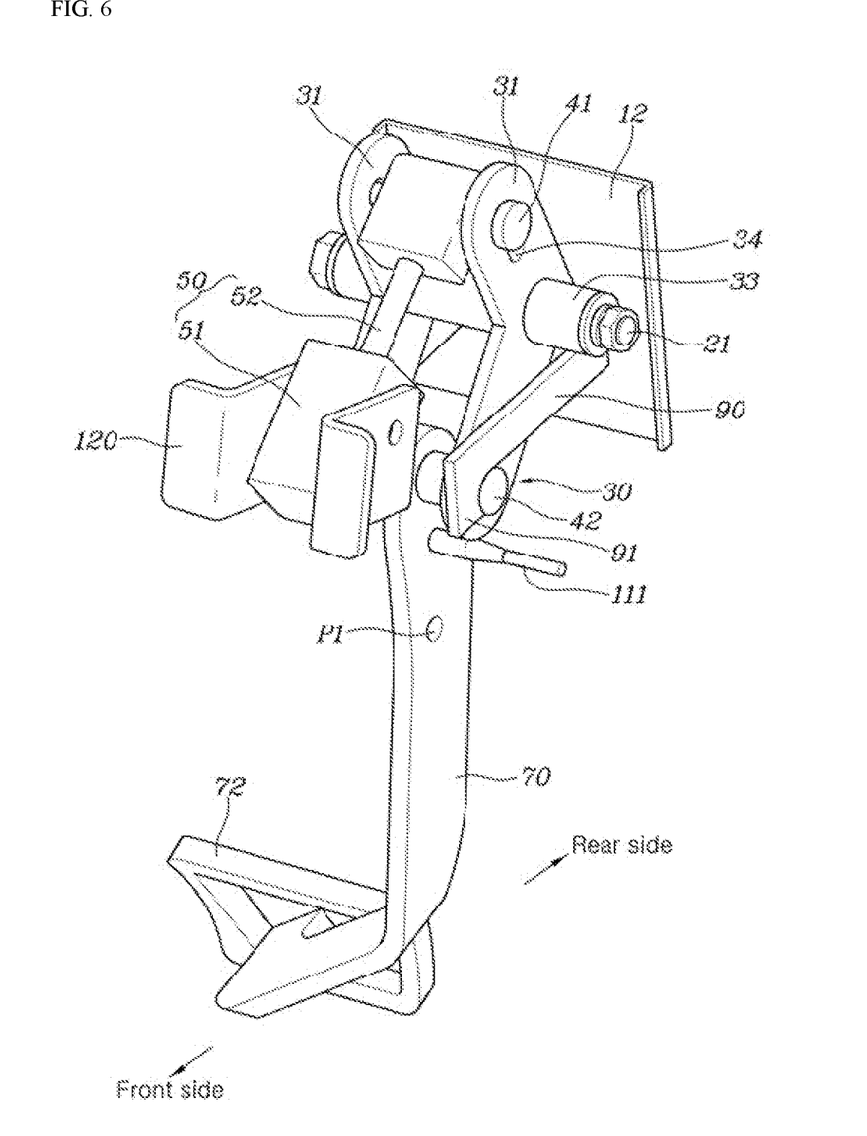
FIG. 6 is a perspective view in which a pedal member and a brake booster is removed in FIG. 1 according to an exemplary embodiment of the present disclosure.
Figure 7:
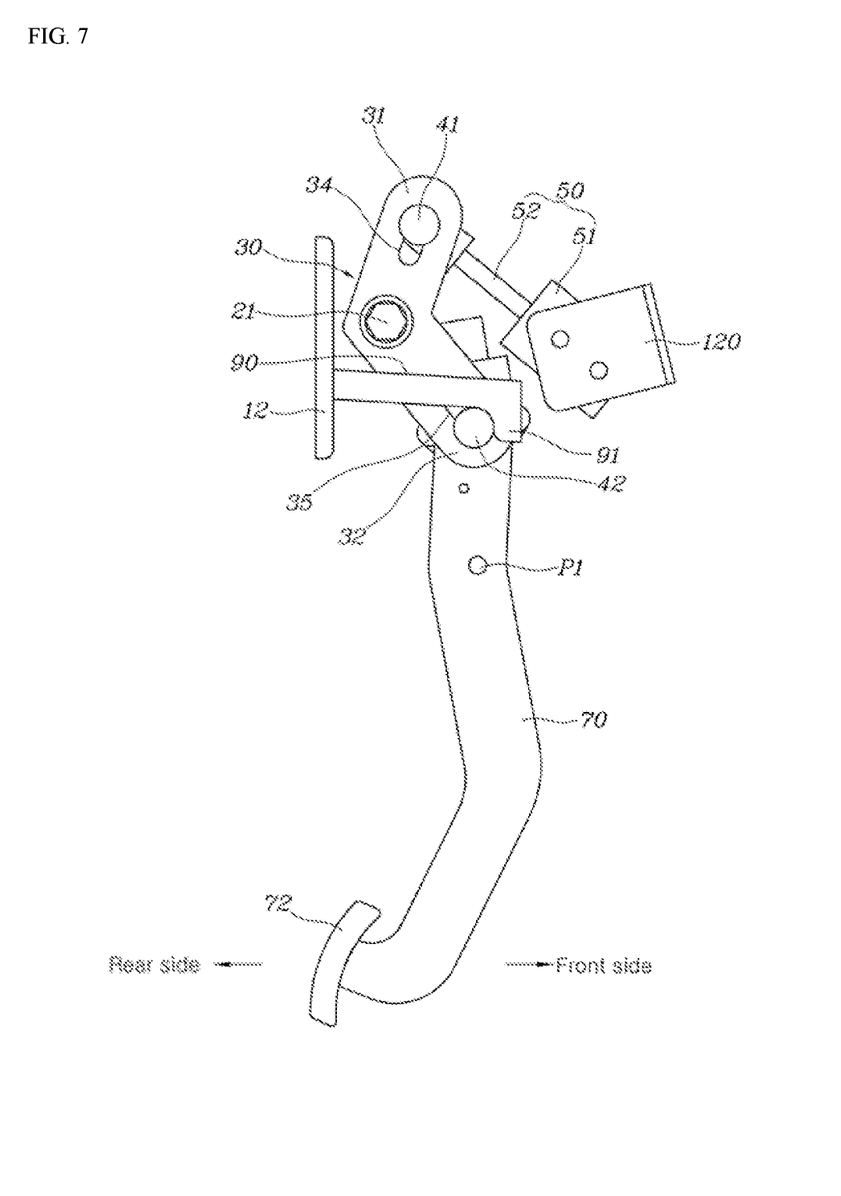
FIG. 7 is a side view of FIG. 6 according to an exemplary embodiment of the present disclosure.
Figure 8:
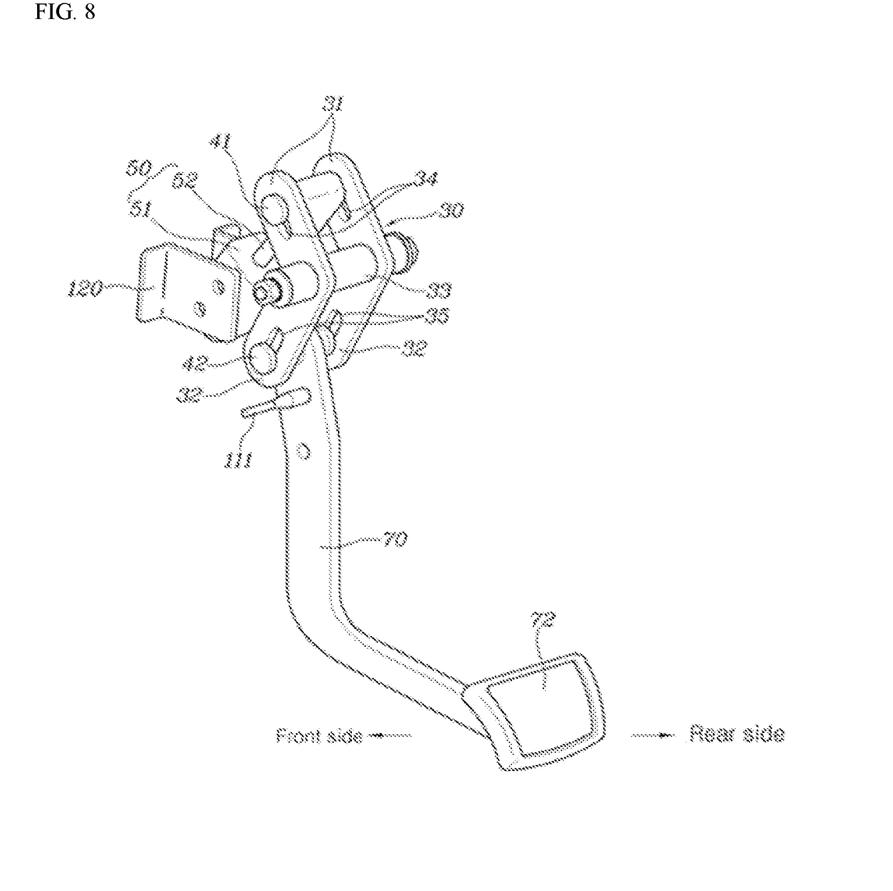
FIG. 8 is a view of a state in which a pedal restraining rod is removed in FIG. 6 according to an exemplary embodiment of the present disclosure.
Figure 9:
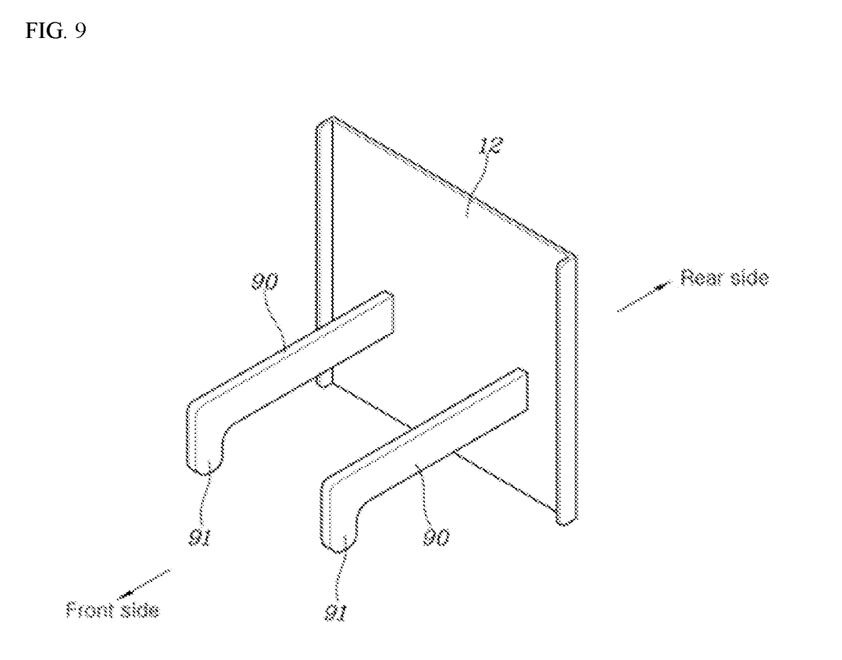
FIG. 9 is a view illustrating a restraining rod provided on a rear surface of the pedal member according to an exemplary embodiment of the present disclosure.
Figure 10A:
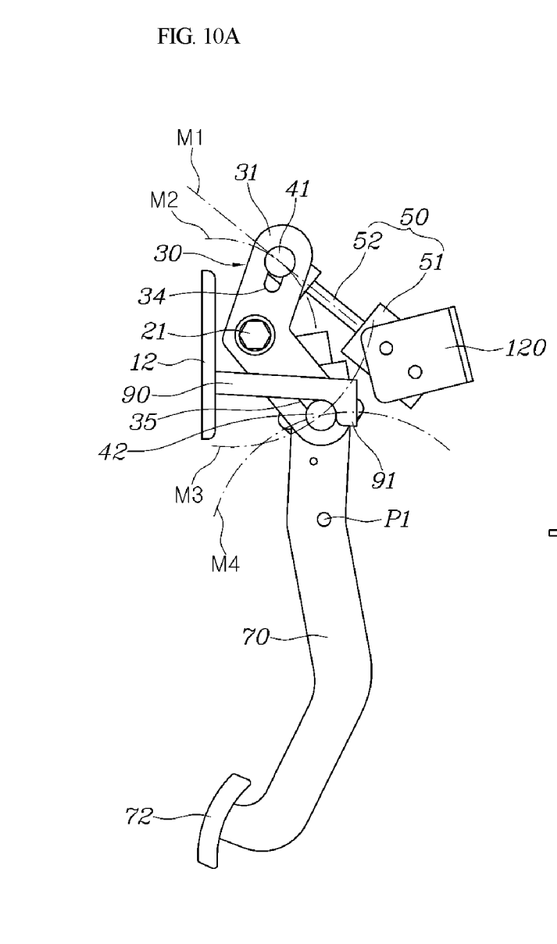
FIGS. 10A-10B are views illustrating operational states of a rotary link and a brake pedal according to an operation of an actuator according to an exemplary embodiment of the present disclosure.
Figure 10B:
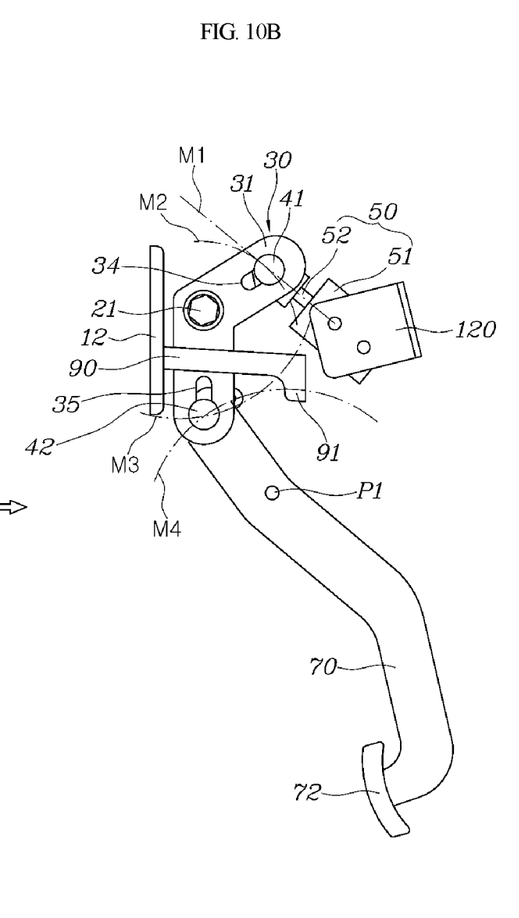

In other words, referring to FIGS. 10A-10B, the upper pin aperture 34 may be an elliptical slot aperture that extends along the lengthwise direction of the first rod 31 since the upper pin 41 may be moved along a linear locus M1 of the plunger 52 and may be moved along a rotational locus M2, the center of which is the hinge bolt 21 at the same time when the rotary link 30 is rotated about the hinge bolt 21 through an operation of the linear motor 51. Further, the lower pin aperture 35 may be an elliptical slot aperture that extends along the lengthwise direction of the second rod 32 since the lower pin 42 may be moved along a rotational locus M3, the center of which is the hinge bolt 21, and may be moved along a rotational locus M4, the center of which is a connection point P1 of the brake pedal 70 and a pedal push rod 61 when the rotary link 30 is rotated about the hinge bolt 21 through an operation of the linear motor 51.

Figure 11A:
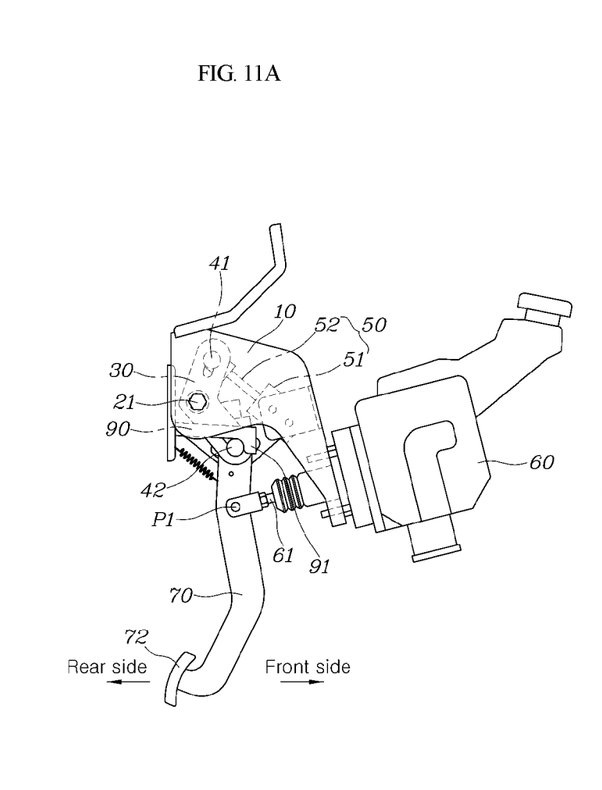
FIGS. 11A-11B are views illustrating a normal operational state of the brake pedal.

FIG. 11A represents a state in which the driver does not engage the brake pedal 70, and is an initial state in which the linear motor 51 is not operated. In the initial state, the hinge bolt 21 and the upper pin 41 may be sequentially disposed on the upper side of the lower pin 42, and the linear motor 51 that forms the actuator 50 may be disposed on the front side of the lower pin 42. When the driver engages the pad 72 of the brake pedal 70 to manipulate the brake pedal 70 in the initial state, as in FIG. 11B, the brake pedal 70 may be rotated forward about the lower pin 42 (arrow R1), and a hydraulic pressure that is necessary for braking may be generated as the brake booster 60 is operated through forward movement of the pedal push rod 61 when the brake pedal 70 is rotated forward.

Figure 11B:
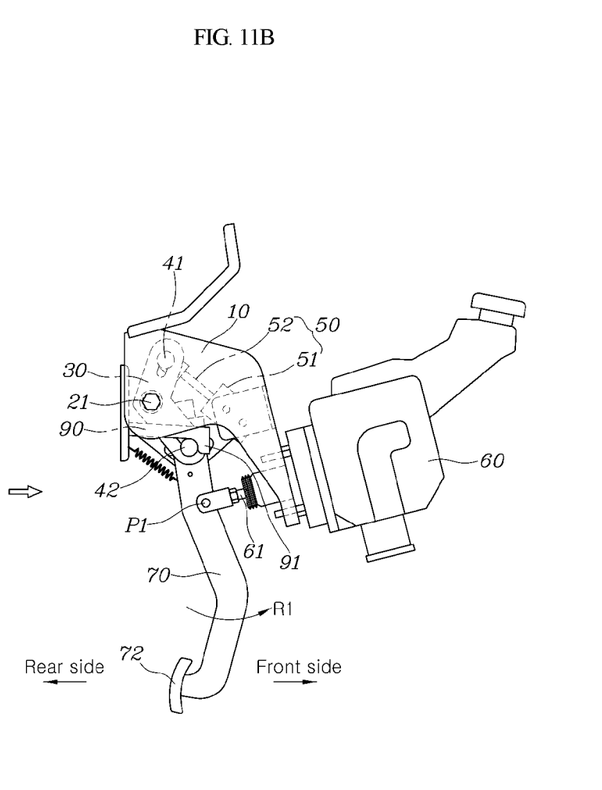

Additionally, when the brake pedal 70 is rotated forward, the lower pin 42 may be maintained in a state in which the lower pin 42 is restrained by the hook part 91 of the restraining rod 90, and accordingly, forward movement of the brake pedal 70 may be restrained. Since the connection pin 111 and the rotary lever 112 may be rotated together when the driver engages the brake pedal 70 to manipulate the brake pedal 70, the pedal sensor 120 may be configured to detect the rotational angle of the brake pedal 70 through a change in the intensity of the magnetic field according to a change in the rotational location of the permanent magnet coupled to the rotary lever 112 to generate a signal related to braking, and thus the vehicle may perform normal braking.

Figure 12A:
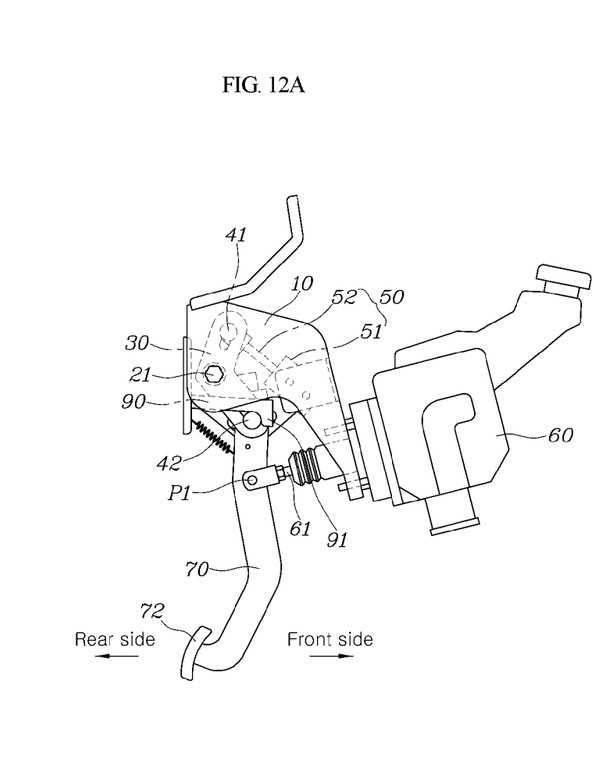
FIGS. 12A-12B are views illustrating a popup state in which a lower end of the brake pedal is exposed to the interior of the vehicle and a state in which the brake pedal is rotated and concealed according to an exemplary embodiment of the present disclosure.
Figure 12B:
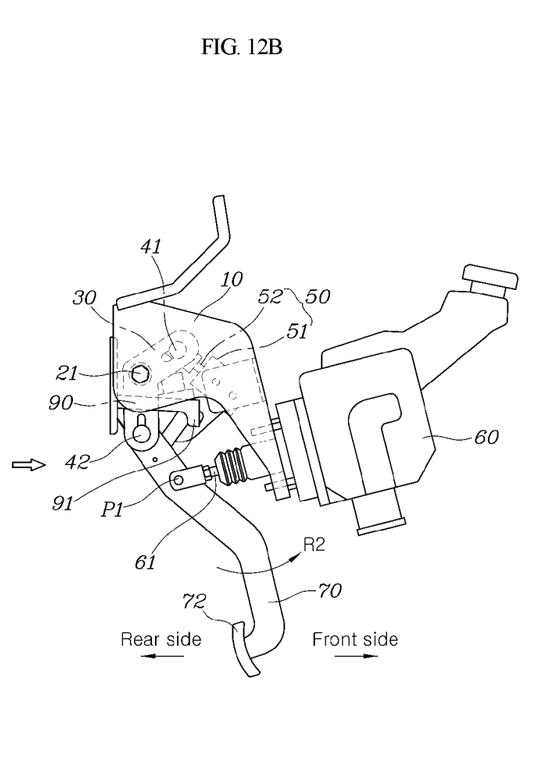

FIG. 12A also represents a state in which the driver does not engage the brake pedal 70, and is an initial state in which the linear motor 51 is not operated. When the linear motor 51 is operated and the plunger 52 is pulled in the initial state as in FIG. 12B, the first rod 31 of the rotary link 30 may be pulled to the front side, on which the linear motor 51 is disposed and the rotary link 30 may be rotated clockwise about the hinge bolt 21, and when the second rod 32 is rotated toward the rear side, the brake pedal 70 may be rotated about the connection point P1 of the brake pedal 70 and the pedal push rod 61 through rearward movement of the lower pin 42 whereby the brake pedal 70 changes to a concealed (hidden) state in which the brake pedal 70 may be prevented from being exposed to the interior of the vehicle as the lower end of the brake pedal 70 is rotated to be moved to the front side (arrow R2).

Since the lower space of the driver's seat becomes a wide space with no interference by the pedal when the brake pedal 70 changes to the concealed state, the driver may take a rest comfortably in a relax mode. To the contrary, since the lower end of the brake pedal 70 is rotated forward as in FIG. 12B, when the plunger 52 protrudes through an operation of the linear motor 51 in the concealed (hidden) state in which the brake pedal 70 is prevented from being exposed to the interior of the vehicle, the first rod 31 of the rotary link 30 may be pushed backwards and the rotary link 30 may be rotated about the hinge bolt 21, and when the second rod 32 is rotated forward, the brake pedal 70 may be rotated about the connection point P1 of the brake pedal 70 and the pedal push rod 61 through forward movement (e.g., a direction that is opposite to arrow R2) of the lower pin 42 whereby the brake pedal 70 may change to a popup state in which the brake pedal 70 protrudes to the interior of the vehicle as the lower end of the brake pedal 70 is rotated to be moved backwards.

As described above, according to the foldable brake pedal apparatus for an autonomous driving vehicle according to the present disclosure, the lower end of the brake pedal may be popped up to be exposed to the interior of the vehicle to allow the driver to manipulate the brake pedal 70 in a manual driving mode in which the driver directly operates the vehicle, and the lower end of the brake pedal 70 may be rotated to be moved forward through an operation of the actuator 50 to conceal the brake pedal 70 to prevent driver manipulation of the brake pedal 70 in an autonomous driving mode in which the driver does not directly operate the vehicle, whereby the driver may take a rest comfortably in the autonomous driving situation, and moreover, the safety of the vehicle may be improved by interrupting a malfunction of the brake pedal 70 in an autonomous driving situation.

Further, according to the exemplary embodiment of the present disclosure, since only the bolt bore 13, through which the hinge bolt 21 passes, is formed on the side surface 11 of the pedal member 10, the strength and the rigidity of the pedal member 10 may be secured by minimizing the number of apertures formed on the side surface 11 of the pedal member 10. Therefore, the disclosed exemplary embodiments of the present disclosure do not limit the technical spirit of the present disclosure but are illustrative, and the scope of the technical spirit of the present disclosure is not limited by the exemplary embodiments of the present disclosure. The scope of the present disclosure should be construed by the claims, and it will be understood that all the technical spirits within the equivalent range fall within the scope of the present disclosure.

What is claimed is:

1. A foldable brake pedal apparatus for an autonomous driving vehicle, comprising:
    a pedal member fixedly installed in a lower space of a driver seat and coupled with a hinge bolt passing through left and right side surfaces of the pedal member;
    a rotary link disposed in the pedal member, through which the hinge bolt passes, and installed to be rotated about the hinge bolt, wherein the rotary link includes a first rod disposed above the hinge bolt and a second rod disposed below the hinge bolt;
    an actuator fixedly installed in the pedal member while being disposed in the pedal member and coupled to be rotated by the first rod of the rotary link and an upper pin; and
    a brake pedal in which an upper end of the brake pedal is inserted into the pedal member, and is coupled to be rotated by the second rod of the rotary link and a lower pin, and in which a lower portion of the lower pin is connected to a brake booster through a pedal push rod.

2. The foldable brake pedal apparatus of claim 1, further comprising:
    a restraining rod, a first end of which is fixed to the pedal member and a second end of which is installed to be stopped by the lower pin, and configured to restrict forward movement of the lower pin when the brake pedal is rotated forward about the lower pin as the brake pedal is engaged.

3. The foldable brake pedal apparatus of claim 2, wherein the restraining rod includes a ring part, a first end of which is fixed to a rear surface of the pedal member and a second end of which extends toward the front side, and wherein the ring part is installed to pass through the upper side of the lower pin and contact the front side.

4. The foldable brake pedal apparatus of claim 1, further comprising:
    a return spring installed to connect the pedal member and the brake pedal, and configured to accumulate an elastic force while the length thereof is prolonged when the brake pedal is rotated to the front side as the brake pedal is engaged and rotate the brake pedal to the rear side with the accumulated elastic force to return the brake pedal when the brake pedal is released.

5. The foldable brake pedal apparatus of claim 1, further comprising:
    a pedal sensor connected to the brake pedal through a mechanical structure while being fixed to the pedal member and configured to detect the rotational angle of the brake pedal and generate a signal related to braking when the brake pedal is rotated.

6. The foldable brake pedal apparatus of claim 1, wherein a bolt bore, through which the hinge bolt passes, is formed on the left and right side surfaces of the pedal member, and wherein the bolt bore has a circulate shape, the cross-section of which is the same as the cross-section of the hinge bolt.

7. The foldable brake pedal apparatus of claim 1, wherein the rotary link includes:
    a link pipe, through which the hinge bolt passes,
    wherein the first rod and the second rod are coupled to a link pipe while defining an obtuse angle, and
    wherein two first rods and two second rods are spaced apart from each other to face each other along the lengthwise direction of the link pipe.

8. The foldable brake pedal apparatus of claim 1, wherein the actuator includes:
    a linear motor fixed to the pedal member by a motor bracket; and
    a plunger configured to move forward and backwards when the linear motor is operated and an end of which is connected to the first rod by the upper pin.

9. The foldable brake pedal apparatus of claim 1, wherein each of the first rod and the second rod includes an upper pin aperture and a lower pin aperture, through which the upper pin and the lower pin pass, respectively, and wherein the upper pin apertures and the lower pin apertures are elliptical slots that extend along the lengthwise directions of the first rod and the second rod.

10. The foldable brake pedal apparatus of claim 1, wherein
    the actuator is disposed on the front side of the lower pin while the hinge bolt and the upper pin are sequentially disposed on the upper side of the lower pin,
    the brake pedal is rotated to the front side about the lower pin in response to the brake pedal being engaged, and
    the brake booster is operated as the pedal push rod is moved forward when the brake pedal is rotated to the front side, and the lower pin is maintained in a state in which the lower pin is restricted by the restraining rod to be prevented from being moved forward.

11. The foldable brake pedal apparatus of claim 1, wherein
    the actuator is disposed on the front side of the lower pin while the hinge bolt and the upper pin are sequentially disposed on the upper side of the lower pin, and
    the first rod is pulled to the front side, on which the actuator is disposed, through an operation of the actuator, and the brake pedal changes to a concealed state, in which the brake pedal is concealed from the interior of the vehicle as a lower end of the brake pedal is rotated to be moved to the front side when the brake pedal is rotated about a connection point of the brake pedal and the pedal push rod through rearward movement of the lower pin when the rotary link is rotated about the hinge bolt and the second rod is rotated toward the rear side.

12. The foldable brake pedal apparatus of claim 11, wherein in the concealed state, the first rod is pushed to the rear side through an operation of the actuator, and the brake pedal changes to a popped-up state, in which the brake pedal is exposed to the interior of the vehicle, as the lower end of the brake pedal is rotated to be moved to the rear side when the brake pedal is rotated about a connection point of the brake pedal and the pedal push rod through forward movement of the lower pin if the rotary link is rotated about the hinge bolt and the second rod is rotated toward the front side.

* * * * *